(12) United States Patent
Taniguchi et al.

(10) Patent No.: US 10,804,826 B2
(45) Date of Patent: Oct. 13, 2020

(54) CONTROL DEVICE AND CONTROL METHOD FOR POWER GENERATION SYSTEM

(71) Applicant: MITSUBISHI HEAVY INDUSTRIES ENGINE & TURBOCHARGER, LTD., Sagamihara-shi, Kanagawa (JP)

(72) Inventors: Junichi Taniguchi, Nagoya (JP); Hiroshi Yamawaki, Nagoya (JP); Yoshiharu Ito, Nagoya (JP); Masao Takatsuka, Sagamihara (JP); Takuya Karatsu, Sagamihara (JP); Hazumu Abe, Sagamihara (JP); Makoto Gohara, Sagamihara (JP)

(73) Assignee: MITSUBISHI HEAVY INDUSTRIES ENGINE & TURBOCHARGER, LTD., Sagamihara-Shi (JP)

(*) Notice: Subject to any disclaimer, the term of this patent is extended or adjusted under 35 U.S.C. 154(b) by 0 days.

(21) Appl. No.: 16/486,036

(22) PCT Filed: Feb. 15, 2018

(86) PCT No.: PCT/JP2018/005344
§ 371 (c)(1),
(2) Date: Aug. 14, 2019

(87) PCT Pub. No.: WO2018/151233
PCT Pub. Date: Aug. 23, 2018

(65) Prior Publication Data
US 2020/0067438 A1    Feb. 27, 2020

(30) Foreign Application Priority Data
Feb. 17, 2017  (JP) ................ 2017-028142

(51) Int. Cl.
*H02P 9/10* (2006.01)

(52) U.S. Cl.
CPC ..................... *H02P 9/10* (2013.01)

(58) Field of Classification Search
CPC ......................................... H02P 9/10
(Continued)

(56) References Cited

U.S. PATENT DOCUMENTS 6,348,743 B1   2/2002 Sakasai et al.
7,106,029 B2*  9/2006 Inokuchi .............. H02J 7/2434
                                                 322/28

(Continued)

FOREIGN PATENT DOCUMENTS

EP   2 162 812 A1   3/2010
JP   59-59098 A     4/1984

(Continued)

OTHER PUBLICATIONS

Extended European Search Report dated Dec. 18, 2019, issued in the corresponding European Application No. 18753660.2.

(Continued)

*Primary Examiner* — Pedro J Cuevas
(74) *Attorney, Agent, or Firm* — Birch, Stewart, Kolasch & Birch, LLP

(57) ABSTRACT

A control device 4 for a power generation system 1 includes a target voltage regulator part 43 configured to adjust the target voltage Vr of a generator 3. The target voltage regulator part 43 has: a voltage decrease function to reduce the target voltage Vr of the generator 3 in accordance with a decrease amount of a detection value Sm of a rotation speed S of a gas engine 2 or a frequency of the generator 3 if the detection value falls below an allowable variation value when a load is connected to the generator 3 via a circuit breaker 5; and a voltage decrease limiting function to maintain the target voltage Vr of the generator 3 at an allowable lower limit voltage determined on the basis of an (Continued)

output voltage V which is allowable to carry out normal operation of the load if the target voltage Vr of the generator 3 is lower than the allowable lower limit voltage.

8 Claims, 8 Drawing Sheets

(58) Field of Classification Search
USPC .............................................. 322/17, 19, 28
See application file for complete search history.

(56) References Cited

U.S. PATENT DOCUMENTS

| | | | | |
|---|---|---|---|---|
| 7,319,300 | B2* | 1/2008 | Hahn | H02P 6/28 |
| | | | | 318/400.08 |
| 7,586,203 | B2* | 9/2009 | Nakamura | H02P 9/14 |
| | | | | 290/38 R |
| 7,782,023 | B2* | 8/2010 | Holguin | H02P 9/105 |
| | | | | 322/28 |
| 8,089,241 | B2* | 1/2012 | Yamakawa | H02P 23/04 |
| | | | | 180/65.21 |
| 9,490,739 | B2* | 11/2016 | Tsai | H02P 23/22 |
| 10,352,298 | B2* | 7/2019 | Tan | H02P 9/007 |
| 10,454,398 | B2* | 10/2019 | Hanseler | H02P 6/08 |
| 2002/0000791 | A1 | 1/2002 | Taniguchi et al. | |
| 2005/0206350 | A1* | 9/2005 | Inokuchi | H02J 7/2434 |
| | | | | 322/28 |
| 2006/0267531 | A1* | 11/2006 | Hahn | H02P 6/28 |
| | | | | 318/400.04 |
| 2008/0129255 | A1* | 6/2008 | Holguin | H02P 9/105 |
| | | | | 322/28 |
| 2009/0237019 | A1* | 9/2009 | Yamakawa | H02P 23/009 |
| | | | | 318/400.09 |
| 2010/0225284 | A1 | 9/2010 | Aoyama | |
| 2015/0023801 | A1* | 1/2015 | Tsai | F04D 27/004 |
| | | | | 417/42 |
| 2015/0115853 | A1* | 4/2015 | Brunotte | H02P 6/10 |
| | | | | 318/400.23 |
| 2018/0171976 | A1* | 6/2018 | Tan | H02K 7/183 |
| 2018/0316290 | A1* | 11/2018 | Hanseler | H02P 23/16 |

FOREIGN PATENT DOCUMENTS

| | | |
|---|---|---|
| JP | 60-84999 A | 5/1985 |
| JP | 2002-17053 A | 1/2002 |
| JP | 2010-206959 A | 9/2010 |

OTHER PUBLICATIONS

International Preliminary Report on Patentability and Written Opinion of the International Searching Authority dated Aug. 29, 2019, for International Application No. PCT/JP2018/005344, with an English Translation of the Written Opinion.

International Search Report, dated May 15, 2018, for International Application No. PCT/JP2018/005344.

Office Action dated Jul. 16, 2020 issued in counterpart European Application No. 18753660.2.

* cited by examiner

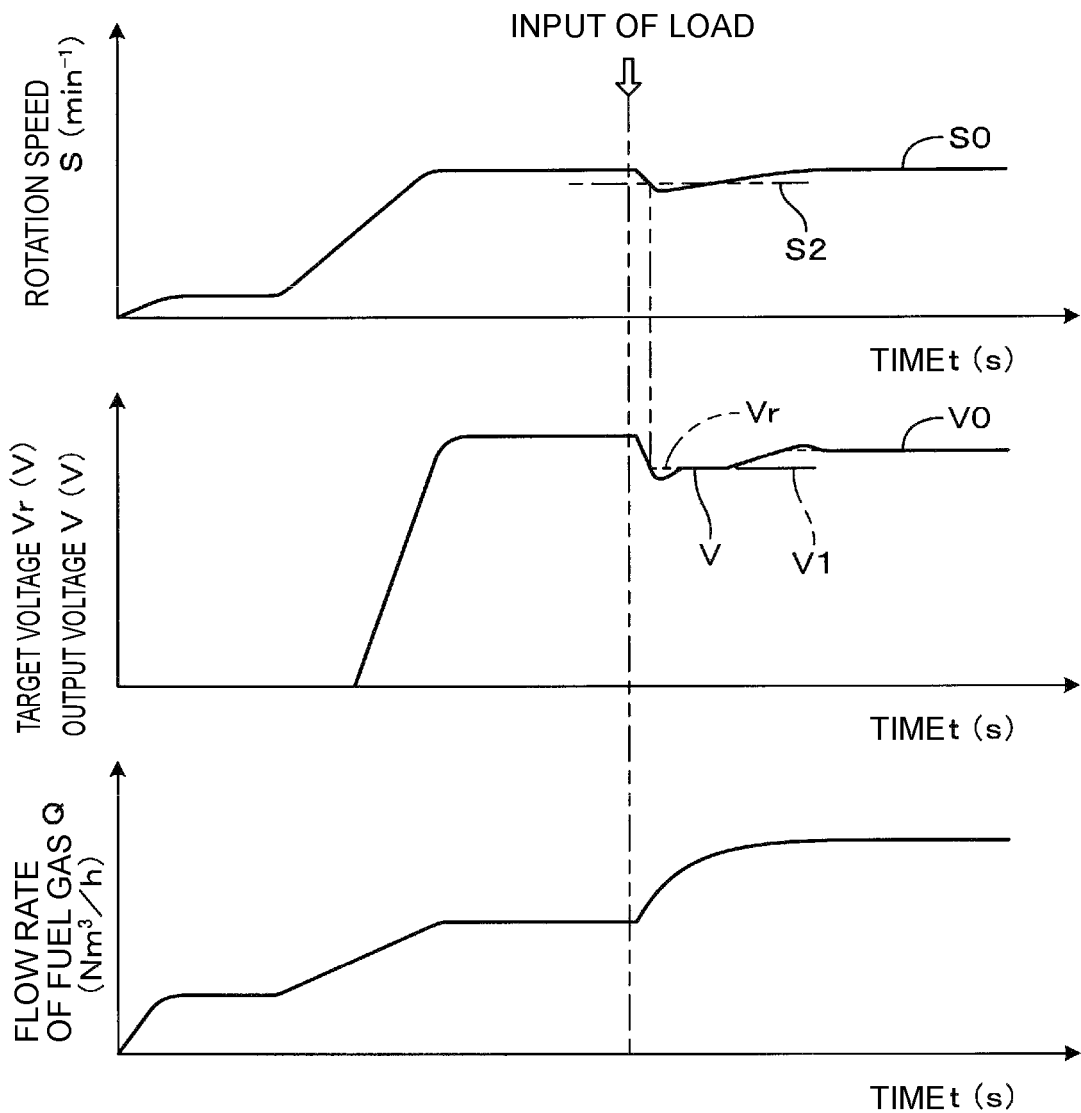

CONTROL DEVICE AND CONTROL METHOD FOR POWER GENERATION SYSTEM

TECHNICAL FIELD

The present invention relates to a control device and a control method for a power generation system.

BACKGROUND ART

A power generation system including a generator which generates power through combustion of an engine is used in, for instance, a co-generation system which enables recovery of cooling heat of the engine and waste heat of exhaust gas of the engine. Furthermore, a power generation system may be configured to be in connection with a grid power, so as to supply electric power to various loads powered by the grid power and supply electric power to essential loads during shutdown of the grid power.

During shutdown of a grid power, when electric power generated by the generator of the power generation system is supplied to loads, rapid input of loads to the generator may lead to temporary reduction of the rotation speed of the engine. In this case, generation of an excessive load on the engine is avoided by reducing the target voltage of the generator in accordance with the decrease amount of the rotation speed of the engine using an automatic voltage adjuster connected to the generator. Accordingly, reduction of the rotation speed of the engine is suppressed, and the recovery time of the rotation speed of the engine is shortened. Patent Document 1 discloses such an automatic voltage adjuster used in a control method and a control device for a diesel power generation facility, for instance.

CITATION LIST

Patent Literature

Patent Document 1: JPS59-59098A

SUMMARY

Problems to be Solved

However, in adjustment of the target voltage of the generator using the automatic voltage adjuster, if the input amount of loads to the generator is high, the target voltage of the generator and the output voltage that follows the target voltage may become unnecessarily low. In this case, while it is possible to avoid an excessive load on the engine, the originally intended purpose, that is, normal supply of electric power to the loads from the engine may be hindered, and normal operation of loads may be no longer possible.

The present invention was made in view of the above, in order to provide a control device and a control method for a power generation system which is capable of, by setting an appropriate target voltage for a generator, suppressing reduction of the rotation speed of the engine to protect the engine from an excessive load and shorten the recovery time of the rotation speed of the engine while supplying electric power required for normal operation of loads from the generator.

Solution to the Problems

According to an embodiment of the present invention, a control device for a power generation system including a generator which generates power through combustion of an engine and supplies electric power to a load via a circuit breaker, includes: an automatic voltage regulator part configured to control an output voltage of the generator to a target voltage of the generator; and a target voltage regulator part configured to adjust the target voltage of the generator. The target voltage regulator part has: a voltage decrease function to reduce the target voltage of the generator in accordance with a decrease amount of a detection value of a rotation speed of the engine or a frequency of the generator if the detection value falls below an allowable variation value when the load is connected to the generator via the circuit breaker; a voltage decrease limiting function to maintain the target voltage of the generator at an allowable lower limit voltage determined on the basis of an output voltage which is allowable to carry out normal operation of the load, or at a value determined on the basis of the allowable lower limit voltage, if the target voltage of the generator which decreases in accordance with the decrease amount of the detection value is lower than the allowable lower limit voltage; and a voltage increase function to increase the target voltage of the generator to a rated voltage at the time of steady operation if the detection value increases again after the detection value falls below the allowable variation value.

According to another embodiment of the present embodiment, a method of controlling a power generation system including a generator which generates power through combustion of an engine and supplies electric power to a load via a circuit breaker, includes: controlling an output voltage of the generator to a target voltage of the generator. The controlling of the output voltage includes: a voltage decrease operation to reduce the target voltage of the generator in accordance with a decrease amount of a detection value of a rotation speed of the engine or a frequency of the generator if the detection value falls below an allowable variation value when the load is connected to the generator via the circuit breaker; a voltage decrease limiting operation to maintain the target voltage of the generator at an allowable lower limit voltage determined on the basis of an output voltage which is allowable to carry out normal operation of the load, or at a value determined on the basis of the allowable lower limit voltage, if the target voltage of the generator which decreases in accordance with the decrease amount of the detection value is lower than the allowable lower limit voltage; and a voltage increase operation to increase the target voltage of the generator to a rated voltage at the time of steady operation if the detection value increases again after the detection value falls below the allowable variation value.

Advantageous Effects

According to the control device and the control method of a power generation system, the target voltage of the generator is reduced in accordance with the decrease amount of the detection value of the rotation speed of the engine or the frequency of the generator, if the detection value falls below an allowable variation value, when the load is connected to the generator via the circuit breaker. Accordingly, it is possible to prevent generation of an excessive load in the engine for changing the output voltage of the generator to the target voltage, and protect the engine from an excessive load. Furthermore, it is possible to suppress reduction of the rotation speed of the engine to the minimum, and shorten the recovery time of the rotation speed of the gas engine.

Further, according to the control device and the control method of the power generation system, the decrease amount of the target voltage of the generator is limited so that the normal operation of the load remains possible. Specifically, the target voltage of the generator is maintained at the allowable lower limit voltage determined on the basis of the output voltage that is allowable to carry out normal operation of the load or a value determined on the basis of the allowable lower limit voltage if the target voltage of the generator falls below the allowable lower limit voltage. Accordingly, it is possible to maintain the target voltage of the generator and the output voltage that follows the target voltage at values necessary to carry out normal operation of the load.

Furthermore, according to the control device and the control method of the power generation system, the target voltage of the generator is increased to the rated voltage at the time of steady operation, if the detection value of the rotation speed of the engine or the frequency of the generator falls below the allowable variation value and then increases again. Accordingly, it is possible to recover the power generation state of the generator to the steady state from the unstable transition state after the load is connected to the generator via the circuit breaker, and supply electric power stably to the load from the generator.

As described above, according to the control device and the control method of the power generation system, it is possible to, by setting an appropriate target voltage for the generator, suppress reduction of the rotation speed of the gas engine to the minimum to protect the engine from an excessive load and shorten the recovery time of the rotation speed of the engine, while supplying electric power required for normal operation of loads from the generator.

BRIEF DESCRIPTION OF DRAWINGS

FIG. 10 is a graph showing the temporal change of rotation speed, target voltage, output voltage, flow rate of fuel gas of a power generation system according to an embodiment.

DETAILED DESCRIPTION

A preferable embodiment according to the above described control device of the power generation system will be described with reference to drawings.

Figure 1:
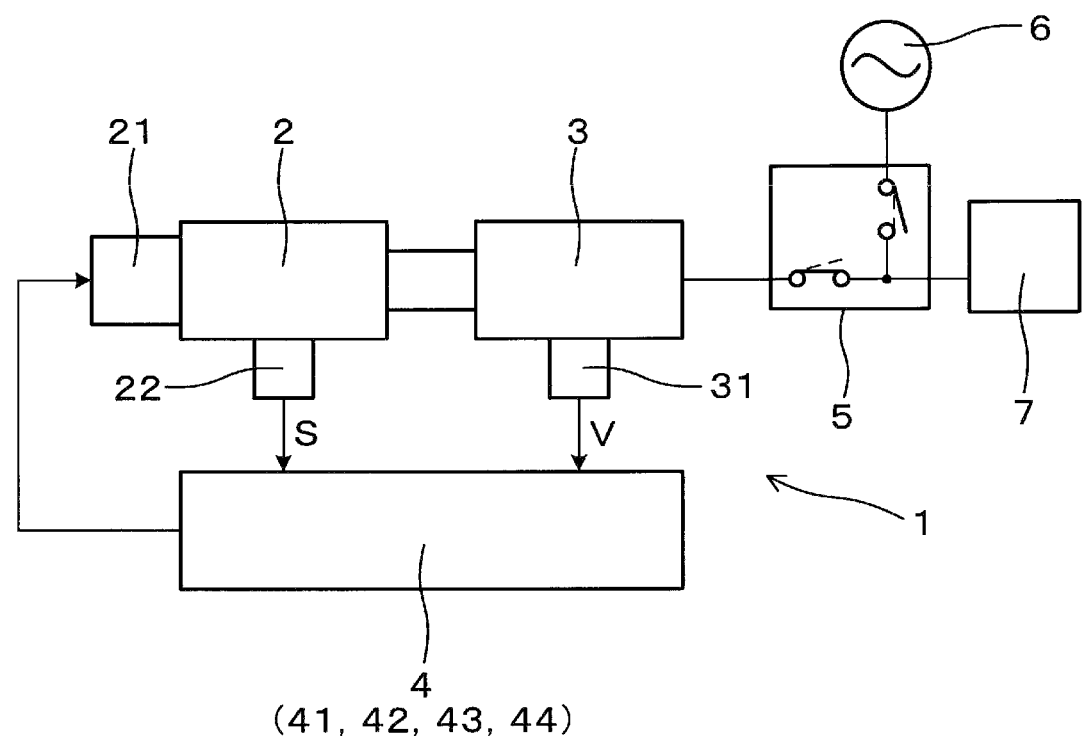
FIG. 1 is an explanatory view showing the configuration of a power generation system according to an embodiment.
Figure 2:
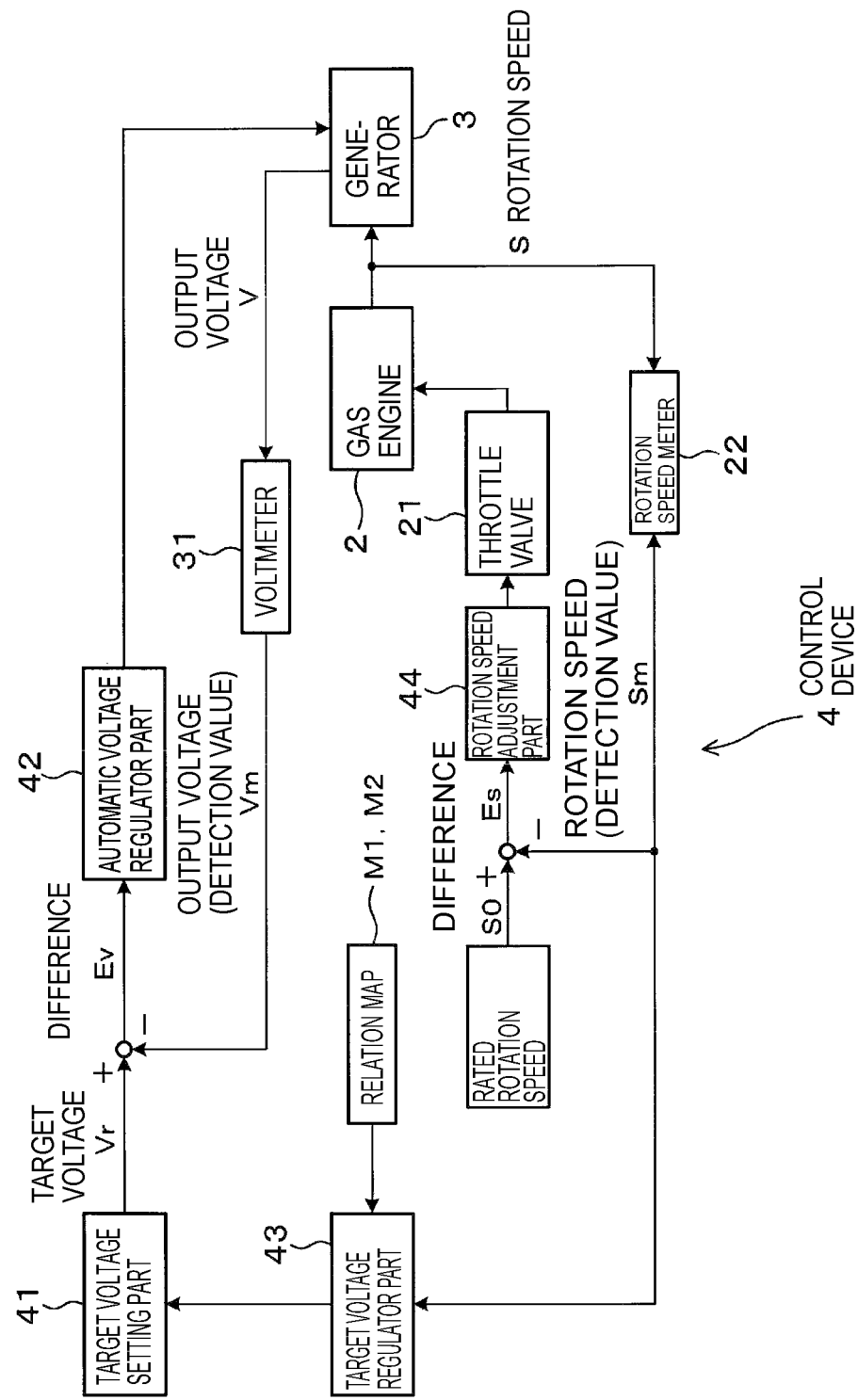
FIG. 2 is a control block diagram showing the control configuration of a power generation system according to an embodiment.

A control device 4 of a power generation system 1 according to the present embodiment is used for the power generation system 1 including a gas engine 2 and a generator 3, as depicted in FIG. 1. The power generation system 1 is configured to generate power with the generator 3 through combustion of the gas engine 2, and supply electric power to a load 7 via a circuit breaker 5 from the generator 3. As depicted in FIG. 2, the control device 4 includes an automatic voltage regulator part 42 configured to control the output voltage V of the generator 3 to the target voltage Vr of the generator 3, and a target voltage regulator part 43 configured to adjust the target voltage Vr of the generator 3.

The target voltage regulator part 43 has a voltage decrease function, a voltage decrease limiting function, and a voltage increase function. That is, the target voltage regulator part 43 has a relation map between the rotation speed and the target voltage as in FIG. 3 and FIG. 4 described below, and is configured to exert the above described voltage decrease function, voltage decrease limiting function, and voltage increase function, by adjusting the target voltage of the generator 3 in accordance with the rotation speed of the gas engine 2 on the basis of the relation map.

Figure 3:
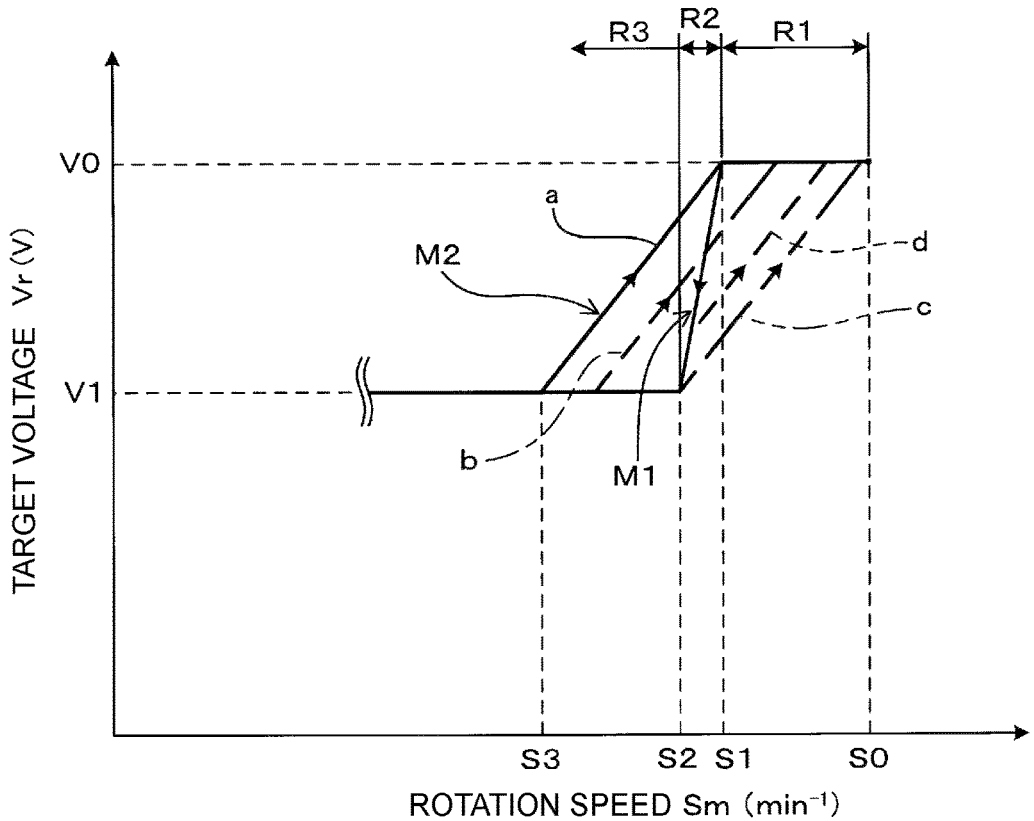
FIG. 3 is a graph showing a relation map between the rotation speed and the target voltage according to an embodiment.

As depicted in FIG. 3, the voltage decrease function is to reduce the target voltage Vr of the generator 3 in accordance with the decrease amount of the detection value Sm of the rotation speed S of the gas engine 2 (number of rotation), if the detection value Sm of the rotation speed S falls below an allowable variation value S1, when the load 7 is connected to the generator 3 via the circuit breaker 5.

The voltage decrease limiting function is to maintain the target voltage Vr of the generator 3 at an allowable lower limit voltage V1 determined on the basis of the output voltage V that is allowable to carry out normal operation of the load 7 if the target voltage Vr of the generator 3 that decreases in accordance with the decrease amount of the detection value Sm of the rotation speed S falls below the allowable lower limit voltage V1. The voltage increase function is to increase the target voltage Vr of the generator 3 to the rated voltage V0 at the time of steady operation in accordance with the increase amount of the detection value Sm, when the detection value Sm of the rotation speed S increases again after the detection value Sm falls below the allowable variation value S1.

It should be noted that the detection value Sm of the rotation speed S may be referred to as the rotation speed Sm. and the detection value Vm of the output voltage V may be referred to as the output voltage Vm.

A control device 4 and a control method for the power generation system 1 of the present embodiment will be described in detail.

As depicted in FIG. 1, the power generation system 1 of the present embodiment includes a stationary gas engine 2 that carries out combustion using gas mixture of fuel gas and air, a generator 3 that is coupled to an output shaft of the gas engine 2 and generates power in response to rotation of the output shaft, and a control device 4 that controls operation of the gas engine 2 and the generator 3. The gas engine 2 includes a throttle valve 21 that regulates the flow rate of gas mixture supplied to a plurality of cylinders of the gas engine 2, and a rotation speed meter (rotation speed detector) 22 that detects the rotation speed S of the gas engine 2, for instance. The generator 3 includes a voltmeter (voltage detector) 31 or the like that detects the output voltage V of the generator 3.

Further, the rotation speed meter 22 may be disposed on the generator 3.

Furthermore, the control device 4 may detect frequency of the generator 3 instead of the rotation speed S of the gas engine 2. The frequency of the generator 3 is proportional to the rotation speed S of the gas engine 2. Thus, the power generation system 1 may perform the control using frequency instead of the rotation speed S. That is, in the relation map depicted in FIG. 3 and FIG. 4 described below, the x-axis may be the frequency of the generator 3 instead of the detection value Sm of the rotation speed S.

Furthermore, the voltage decrease function of the target voltage regulator part 43 may detect reduction of the frequency of the generator 3 below an allowable variation value instead of reduction of the detection value Sm of the rotation speed S of the gas engine 2 below the allowable variation value S1. This is because, as the rotation speed S of the gas engine 2 decreases, the frequency of the generator 3 also decreases.

The allowable variation value S1 of the rotation speed S used in the voltage decrease function of the target voltage regulator part 43 may be a value within the 90-99.9% range of the rated rotation speed, which is a rated value of the rotation speed S, for instance. The frequency can be detected similarly instead of the rotation speed S.

The rated rotation speed S0 of the gas engine 2 is determined as a value that allows appropriate use of the gas engine 2 on the basis of the design spec of the gas engine 2. The rated voltage V0 of the generator 3 is determined as a value that allows appropriate usage of the generator 3 on the basis of the design spec of the generator 3.

The allowable lower limit voltage V1 used in the voltage decrease limiting function of the target voltage regulator part 43 can be set suitably in accordance with the type of the load 7. For instance, the allowable lower limit voltage V1 can be set as a value at the time when the voltage used by the load 7 decreases to the 60-95% range of the rated voltage of the load 7, which is a case where the normal operation of the load 7 is difficult.

As depicted in FIG. 1, the load 7 to be supplied with electric power from the generator 3 of the power generation system 1 is normally powered by a grid power 6. The power generation system 1 functions as a backup power source of the grid power 6 at the time of shutdown of the grid power 6. A circuit breaker 5 is disposed in the line between the grid power 6 and the input terminal of the load 7, and in the line between the output terminal of the generator 3 and the input terminal of the load 7. The circuit breaker 5 is capable of switching connection of the load 7 either between connection to one of the grid power 6 or the generator 3, or connection to both of the grid power 6 and the generator 3. The control device 4 of the power generation system 1 is capable of operating the circuit breaker 5.

The power generation system 1 is capable of configuring a co-generation system that generates power using the gas engine 2 and the generator 3, and recovers cooling heat of the gas engine 2 and waste heat of exhaust gas discharged from the gas engine 2. The power generation system 1 is installed in a factory or a facility, for instance. The power generation system 1 may be configured to be in connection with the grid power 6 so as to supply electric power to the load 7.

The load 7 supplied with electric power from the power generation system 1 may include, for instance, a power device such as a pump and a fan, various computers of large and small sizes, various control facilities, various electric appliances, lighting devices, and air-conditioning devices. Further, in particular, the allowable lower limit voltage V1 that is allowable to carry out normal operation of the load 7 can be set as a voltage necessary for operation of control relays, sequencers, and the like, used in the control device of the load 7 for operating various loads 7.

As depicted in FIG. 2, the control device 4 includes, besides the automatic voltage regulator part 42 and the target voltage regulator part 43, a target voltage setting part 41 that sets the target voltage Vr of the generator 3, and a rotation speed adjustment part 44 that adjusts the opening degree of the throttle valve 21 so that the rotation speed S of the gas engine 2 becomes the rated rotation speed S0.

The target voltage setting part 41 sets the target voltage Vr of the generator 3 for supplying electric power to the load 7 from the generator 3. Further, the automatic voltage regulator part 42 adjusts the field current of the generator 3 so as to eliminate the difference Ev between the target voltage Vr set by the target voltage setting part 41 and the output voltage Vm detected by the voltmeter 31 (detection value of output voltage).

The rotation speed S of the gas engine 2 is set at the rated rotation speed S0, and the rotation speed adjustment part 44 adjusts the opening degree of the throttle valve 21 so as to eliminate the difference Es between the rated rotation speed S0 and the rotation speed Sm detected by the rotation speed meter 22 (detection value of rotation speed).

Furthermore, the output voltage V of the generator 3 is changed by the rotation speed S of the gas engine 2, and the field current of the generator 3 is adjusted in accordance with the difference Ev between the target voltage Vr and the output voltage Vm.

As depicted in FIG. 2, the rotation speed Sm detected by the rotation speed meter 22 is read in by the target voltage regulator part 43. If the rotation speed Sm detected by the rotation speed meter 22 falls below the allowable variation value S1, the target voltage regulator part 43 decreases the target voltage Vr in accordance with the decrease amount of the rotation speed Sm.

The target voltage regulator part 43 adjusts the target voltage Vr of the generator 3 by using relation maps M1, M2 that show relationships between the rotation speed Sm of the gas engine 2 and the target voltage Vr of the generator 3 that is adjusted in accordance with the change in the rotation speed Sm. Furthermore, the target voltage setting part 41 sets the target voltage Vr of the generator 3 adjusted by the target voltage regulator part 43 on the basis of the relation maps M1, M2. Further, the automatic voltage regulator part 42 controls the output voltage V in accordance with the freshly set target voltage Vr.

FIG. 3 shows relation maps M1, M2 stored in the target voltage regulator part 43. In the present embodiment, the speed to change the target voltage Vr is different between a case where the rotation speed Sm decreases and a case where the rotation speed Sm increases. Specifically, the increase gradient of the target voltage Vr of the generator 3 with respect to the increase amount of the rotation speed Sm in the voltage increase function is less steep than the decrease gradient of the target voltage Vr of the generator 3 with respect to the decrease amount of the rotation speed Sm in the voltage increase function.

When the load 7 is connected to the generator 3, if the rotation speed Sm falls below the allowable variation value S1, reduction of the rotation speed S of the gas engine 2 is suppressed by quickly reducing the target voltage Vr. Meanwhile, when the rotation speed S of the gas engine 2 is increased after the load 7 is connected to the generator 3, rapidly increasing the target voltage Vr may increase the load of combustion of the gas engine and conversely cause reduction of the rotation speed S of the gas engine 2. Thus, the rotation speed S of the gas engine 2 is increased gradually to reduce the load of the gas engine 2 and protect the gas engine 2 from an excessive load.

As depicted in the drawing, the relation maps M1, M2 of the present embodiment include a decrease relation map M of a case where the rotation speed Sm decreases and an increase relation map M2 of a case where the rotation speed Sm increases. The decrease relation map M1 has a relationship expression between the rotation speed Sm and the target voltage Vr in a case where the rotation speed Sm is in the three respective ranges R1, R2, R3. The increase relation map M2 is shown as a relation expression at the time when the rotation speed Sm increases again after reduction of the rotation speed Sm below the allowable variation value S1.

In the decrease relation map M1, the first range R1 of the rotation speed Sm is set within a range where the rotation speed Sm is not lower than the allowable variation value S1, that is, within a range of the allowable variation rate of the rated rotation speed S0 at the time of steady operation. In the first range R1, regardless of the change in the rotation speed Sm, the target voltage Vr is maintained at the rated voltage V0 at the time of steady operation.

Further, the second range R2 of the rotation speed Sm is set within a range where the rotation speed Sm is not lower than an allowable lower limit rotation speed S2 which is lower than the allowable variation value S1 and which corresponds to the allowable lower limit voltage V1. In the second range R2, a proportional relationship is formed between the rotation speed Sm and the target voltage Vr, where the target voltage Vr decreases with reduction of the rotation speed Sm. The second range R2 is a range where the voltage decrease function is performed, and in the second range R2, the target voltage Vr is reduced rapidly in accordance with the decrease amount of the rotation speed Sm.

Further, the relationship between the rotation speed Sm and the target voltage Vr in the second range R2 may not necessarily be a proportional relationship, and can be a curve relationship as long as the target voltage Vr decreases with the rotation speed Sm.

Further, the third range R3 of the rotation speed Sm is set within a range where the rotation speed Sm is lower than the allowable lower limit rotation speed S2. In the third range R3, the target voltage Vr is maintained at the allowable lower limit voltage V1 even though the rotation speed Sm decreases to a rotation speed that is lower than the allowable lower limit rotation speed S2. The third range R3 is a range where the voltage decrease limiting function is performed.

When the load 7 is connected to the generator 3, the extent of reduction of the rotation speed Sm of the gas engine 2 changes depending on the load condition of the load 7. Further, the increase relation map M2 of the present embodiment is set as a proportional relation where the target voltage Vr increases with the rotation speed Sm. The increase rate (increase gradient) of the target voltage Vr in the increase relation map M2 is set to be smaller than the decrease rate (decrease gradient) of the target voltage Vr of the second range R2 in the decrease relation map M1. The voltage increase function of the present embodiment is carried out by the increase relation map M2.

In the voltage increase function, the target voltage Vr can be recovered (increased) starting from the lowest decreased value to which the rotation speed Sm decreases. In the increase relation map M2 in FIG. 3, the relation line 'a' connects the end point of the return of the target voltage Vr to the rated voltage V0 with the allowable variation value S1 of the rotation speed Sm. In the relation line 'a', the rotation speed Sm being the starting point to increase the target voltage Vr is shown as the starting point rotation speed S3.

When the load 7 is connected to the generator 3, if the rotation speed Sm of the gas engine 2 falls below the starting point rotation speed S3, the target voltage Vr can be increased on the basis of the increase relation map M2 after the rotation speed Sm increases to the starting point rotation speed S3. Further, in this case, the target voltage Vr can be increased on the basis of the increase relation map M2 starting from the lowest decreased value of the rotation speed Sm of the gas engine 2.

Further, in the increase relation map M2 of the present embodiment, when the load 7 is connected to the generator 3, even if the rotation speed Sm of the gas engine 2 does not fall below the starting point rotation speed S3, it is possible to recover the target voltage Vr to the rated voltage V0 before the rotation speed Sm recovers to the rated rotation speed S0. In FIG. 3, the increase relation map M2 of this case is shown as the relation lines 'b', 'c', and 'd'. In particular, the relation line 'd' shows a case where the lowest decreased value of the rotation speed Sm does not reach the allowable lower limit rotation speed S2.

Figure 4:
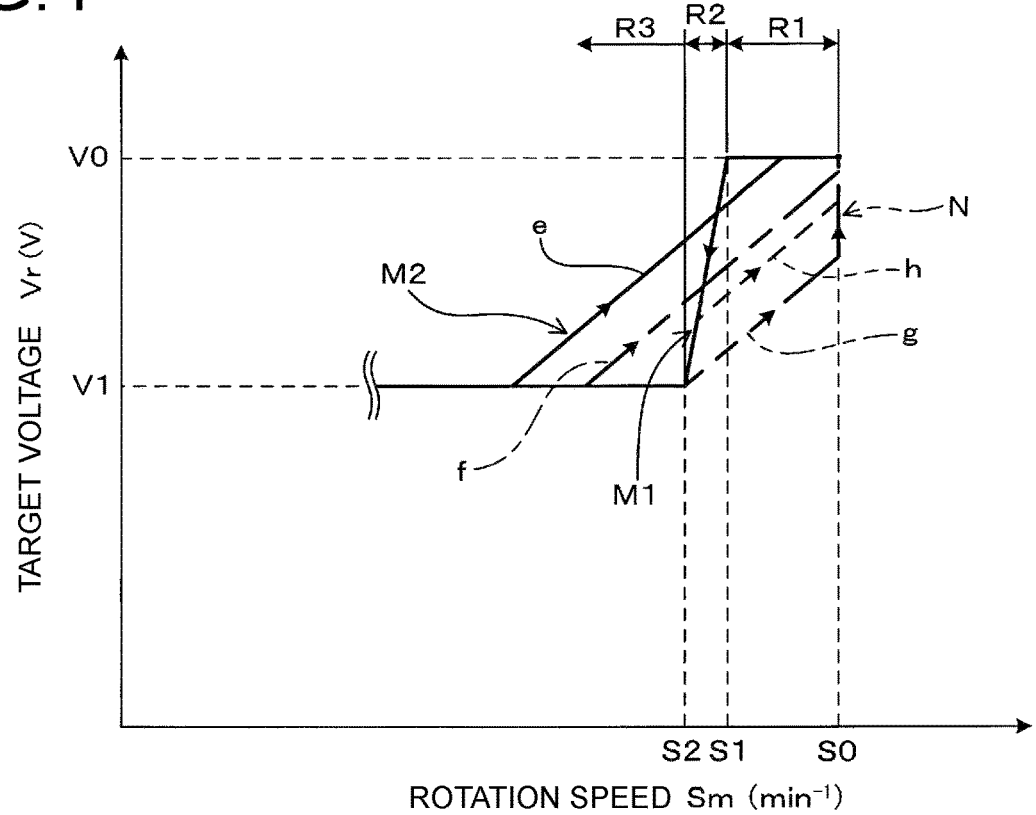
FIG. 4 is a graph showing another relation map between the rotation speed and the target voltage according to an embodiment.

Depending on the relationship between the value of the allowable variation value S1 (difference between the rated rotation speed S0 and the allowable variation value S1 of the rotation speed Sm) and the increase rate of the target voltage Vr in the increase relation map M2, in the increase relation map M2, it may not be possible to recover the target voltage Vr to the rated voltage V0 before the rotation speed Sm recovers to the rated rotation speed S0. Such a case appears, as depicted in FIG. 4, when the allowable variation value S1 is set as a value close to the rated rotation speed S0, and when the increase rate of the target voltage Vr in the increase relation map M2 is lower, for instance.

In the drawing, in a case where the rotation speed Sm of the lowest decreased value at the time when the rotation speed Sm of the gas engine 2 decreases is even lower (the decrease amount of the rotation speed Sm is high), the target voltage Vr in the increase relation map M2 is determined only on the basis of the increase relation map M2 as shown in the relation line 'e'. However, in a case where the rotation speed Sm of the lowest value is not that small (if the decrease amount of the rotation speed Sm is small), the target voltage Vr in the increase relation map M2 cannot be recovered to the rated voltage V0 before the rotation speed Sm recovers to the rated rotation speed S0 as shown in relation lines f, 'g', and 'h'.

When the increase relation map M2 of the relation lines 'f', 'g', and 'h' is used, the voltage increase function uses a timer function N in addition to the increase relation map M2. That is, the target voltage regulator part 43 has a non-depicted timer, and is configured to adjust (increase) the target voltage in accordance with the elapsed time of the timer to exert to the above voltage increase function.

The above case appears, in the voltage increase function, as a case where the rotation speed Sm exceeds the rated rotation speed (rated value) S0 at the time of steady operation when the target voltage Vr of the generator 3 is increased in accordance with the increase amount of the rotation speed Sm.

In this case, while increasing the target voltage Vr on the basis of the increase relation map M2, after the rotation speed Sm reaches the rated rotation speed S0, the timer function N is used to gradually increase the target voltage Vr with time. The increase rate of the target voltage Vr by the timer function N can be similar to the increase rate of the target voltage Vr in the increase relation map M2. The increase rate of the target voltage Vr by the timer function N can be determined taking account of various conditions.

In FIG. 4, to show each of the relation maps M1, M2, the timer function N is shown as if the target voltage Vr increases at once when the rotation speed Sm reaches the rated rotation speed S0. However, in reality, the timer function N is for determining the amount of change of the target voltage Vr with respect to time, and cannot be expressed fully by FIG. 4. The timer function N can be configured to increase the target voltage Vr at a predetermined voltage increase rate. Further, the timer function N may be configured to obtain the difference between the rated voltage V0 and the target voltage Vr at the time when the rotation speed Sm reaches the rated rotation speed S0, and determine the voltage increase rate taking into account the difference so that the target voltage Vr reaches the rated voltage V0 after a predetermined period of time.

By using the timer function N, it is possible to avoid a rapid increase of the target voltage Vr when the rotation speed Sm recovers to the rated rotation speed S0 while the target voltage Vr is increased on the basis of the increase relation map M2. Accordingly, it is possible to prevent unstable supply of electric power to the load 7 from the generator 3.

Meanwhile, the timer function may be used instead of the increase relation map M2 before the rotation speed Sm reaches the rated rotation speed S0 while the target voltage Vr is increased on the basis of the increase relation map M2. Further, in a case where the rotation speed Sm of the lowest decreased value is not that small (decrease amount of the rotation speed Sm is small), it is possible to expect the rotation speed Sm to exceed the rated rotation speed S0 while the target voltage Vr is increased on the basis of the increase relation map M2. In this case, it is possible to use the timer function instead of the increase relation map M2 at an appropriate timing.

Furthermore, it is possible to use only the timer function N instead of the increase relation map M2. In this case, the voltage increase function is configured to increase the target voltage Vr of the generator 3 gradually with time. In this case, the target voltage Vr can be increased by various methods. For instance, when the rotation speed Sm falls below the allowable variation value S1 and increases again, it is possible to maintain the decreased state of the target voltage Vr. and increase the target voltage Vr gradually to the rated voltage V0, after the rotation speed Sm recovers to the rated rotation speed S0. In particular, after the target voltage Vr is limited to the allowable lower limit voltage V1 by reduction of the rotation speed Sm, it is possible to wait for recovery of the rotation speed Sm to the rated rotation speed S0 while maintaining the allowable lower limit voltage V1, and then increase the target voltage Vr gradually to the rated voltage V0 with the timer function N.

In this case, by recovering the target voltage Vr gradually, it is possible to stabilize supply of electric power to the load 7 from the generator 3.

Next, a method for controlling the power generation system 1 using the control device 4 will be described with reference to the flowcharts of FIGS. 5 to 7.

First, in a state where the load 7 is not connected to the generator 3, the gas engine 2 is started, and power generation by the generator 3 is started. Further, the control device 4 sets the rated rotation speed S0 of the gas engine 2 and the target voltage Vr of the generator 3 (step St1 of FIG. 5). At this time, the target voltage Vr is set to the rated voltage V0. In the present embodiment, the rotation speed adjustment part 44 of the control device 4 controls the rotation speed S of the gas engine 2 to be always at the rated rotation speed S0, while the rotation speed S changes in response to connection of the load 7 to the generator 3.

Further, at the gas engine 2, the rotation speed meter 22 detects the rotation speed Sm, and at the generator 3, the voltmeter 31 detects the output voltage Vm (St2). Further, the rotation speed adjustment part 44 of the control device 4 controls the rotation speed Sm to the rated rotation speed S0, and the automatic voltage regulator part 42 of the control device 4 controls the output voltage Vm to the target voltage Vr (St3).

Next, the control device 4 determines whether the rotation speed Sm is at the rated rotation speed S0, and the output voltage Vm is at the target voltage Vr (St4). Then, if the conditions of the above determination are satisfied, the control device 4 operates the circuit breaker 5 to connect (input) the load 7 to the generator 3 (St5 of FIG. 6). It should be noted that the circuit breaker 5 can be operated also by an operator. The reference sign 'a' in FIG. 5 shows that the flowchart continues to the reference sign 'a' in FIG. 6.

When the load 7 is connected to the generator 3, the rotation speed S of the gas engine 2 and the output voltage V of the generator 3 drop rapidly. Thus, the rotation speed adjustment part 44 controls the rotation speed Sm to change toward the rated rotation speed S0, and the automatic voltage regulator part 42 controls the output voltage Vm to change toward the target voltage Vr. Further, the opening degree of the throttle valve 21 increases, and the flow rate of fuel gas to the gas engine 2 increases rapidly. At this time, the control device 4 sets the target voltage Vr of the generator 3 appropriately through function of the target voltage regulator part 43 shown below.

When the load 7 is connected to the generator 3, the control device 4 detects the rotation speed Sm with the rotation speed meter 22, detects the output voltage Vm with the voltmeter 31 (St6), and then determines whether the rotation speed Sm of the gas engine 2 has fallen below the allowable variation value S1 (St7). Instead of determining the rotation speed Sm, the control device 4 may determine whether the detection value of the frequency of the generator 3 has fallen below the allowable variation value. If the rotation speed Sm of the gas engine 2 is not below the allowable variation value S1, the control device 4 maintains the target voltage Vr of the generator 3 at the rated voltage V0 (St5). Further, the rotation speed adjustment part 44 of the control device 4 controls the rotation speed Sm to the rated rotation speed S0, and the automatic voltage regulator part 42 of the control device 4 controls the output voltage Vm to the target voltage Vr (St12). At this time, through feedback control by the automatic voltage regulator part 42, the output voltage V of the generator 3 is maintained at the rated voltage V0.

On the other hand, if the rotation speed Sin of the gas engine 2 falls below the allowable variation value S1 in step St7, the control device 4 determines whether the target voltage Vr of the generator 3 has fallen below the allowable lower limit voltage V1 determined on the basis of the output voltage V that is allowable to carry out normal operation of the load 7 (St9). In this case, if the target voltage Vr is not lower than the allowable lower limit voltage V1, the control device 4 reduces the target voltage Vr of the generator 3 in accordance with the decrease amount of the rotation speed Sm, as a voltage decrease function (St10). At this time, specifically, as shown in FIG. 3 or 4, the rotation speed Sm that is read in by the target voltage regulator part 43 of the control device 4 is within the second range R2, and the target voltage regulator part 43 compares the rotation speed Sin to the decrease relation map M1, and calculates the target voltage Vr as a value lower than the rated voltage V0 and not lower than the allowable lower limit voltage V1.

Further, the target voltage Vr adjusted by the target voltage regulator part 43 is set to the target voltage setting part 41. The automatic voltage regulator part 42 of the control device 4 is controlled so that the output voltage Vm becomes the target voltage Vr (St12). At this time, through feedback control by the automatic voltage regulator part 42, the output voltage V of the generator 3 is adjusted to an appropriate voltage corresponding to the reduced value of the rotation speed Sm. Further, while the rotation speed Sm has fallen to a predetermined value, the rotation speed adjustment part 44 of the control device 4 controls the rotation speed Sm to be always at the rated rotation speed S0.

When the rotation speed Sm becomes lower than the allowable variation value S1, by reducing the target voltage Vr of the generator 3 rapidly on the basis of the decrease relation map M1, it is possible to prevent generation of an excessive load in the gas engine 2 for changing the output voltage V of the generator 3 to the target voltage Vr. In this way, it is possible to protect the gas engine 2 from an excessive load, and prevent stall of the engine. Furthermore, it is possible to suppress reduction of the rotation speed Sm of the gas engine 2 to the minimum, and shorten the recovery time of the rotation speed Sm of the gas engine 2.

On the other hand, if the target voltage Vr falls below the allowable lower limit voltage V1 in step St9, to avoid negative influence on the load 7, the control device 4 maintains the target voltage Vr of the generator 3 at the allowable lower limit voltage V1 as a voltage decrease limiting operation (St11). At this time, as shown in FIG. 3 or 4, the rotation speed Sm to be read in by the target voltage regulator part 43 of the control device 4 is within the third range R3, and the target voltage regulator part 43 compares the rotation speed Sm to the decrease relation map M1, and calculates the target voltage Vr as the allowable lower limit voltage V1.

Further, the target voltage Vr by the target voltage regulator part 43 is set to the target voltage setting part 41. The automatic voltage regulator part 42 of the control device 4 is controlled so that the output voltage Vm becomes the target voltage Vr (St12). At this time, through feedback control by the automatic voltage regulator part 42, the output voltage V of the generator 3 is maintained to the allowable lower limit voltage V1. Further, while the rotation speed Sm has fallen to a value lower than the allowable lower limit rotation speed S2, the rotation speed adjustment part 44 of the control device 4 controls the rotation speed Sm to be always at the rated rotation speed S0.

As described above, in a case where reduction of the rotation speed Sm of the gas engine 2 is remarkable, by not reducing the target voltage Vr of the generator 3 too much and limiting the decrease value of the target voltage Vr to the allowable lower limit voltage V1, it is possible to maintain the target voltage Vr of the generator 3 at a value necessary to carry out normal operation of the load 7.

Next, the rotation speed Sm of the gas engine 2 reaches the lowest value and then increases again. Until the rotation speed Sm starts an increasing trend (St13), the control device 4 repeats steps St6 to St12. The change of the rotation speed Sm to an increasing trend is determined by comparing the previously detected rotation speed Sm and the currently detected rotation speed Sm.

Figure 6:
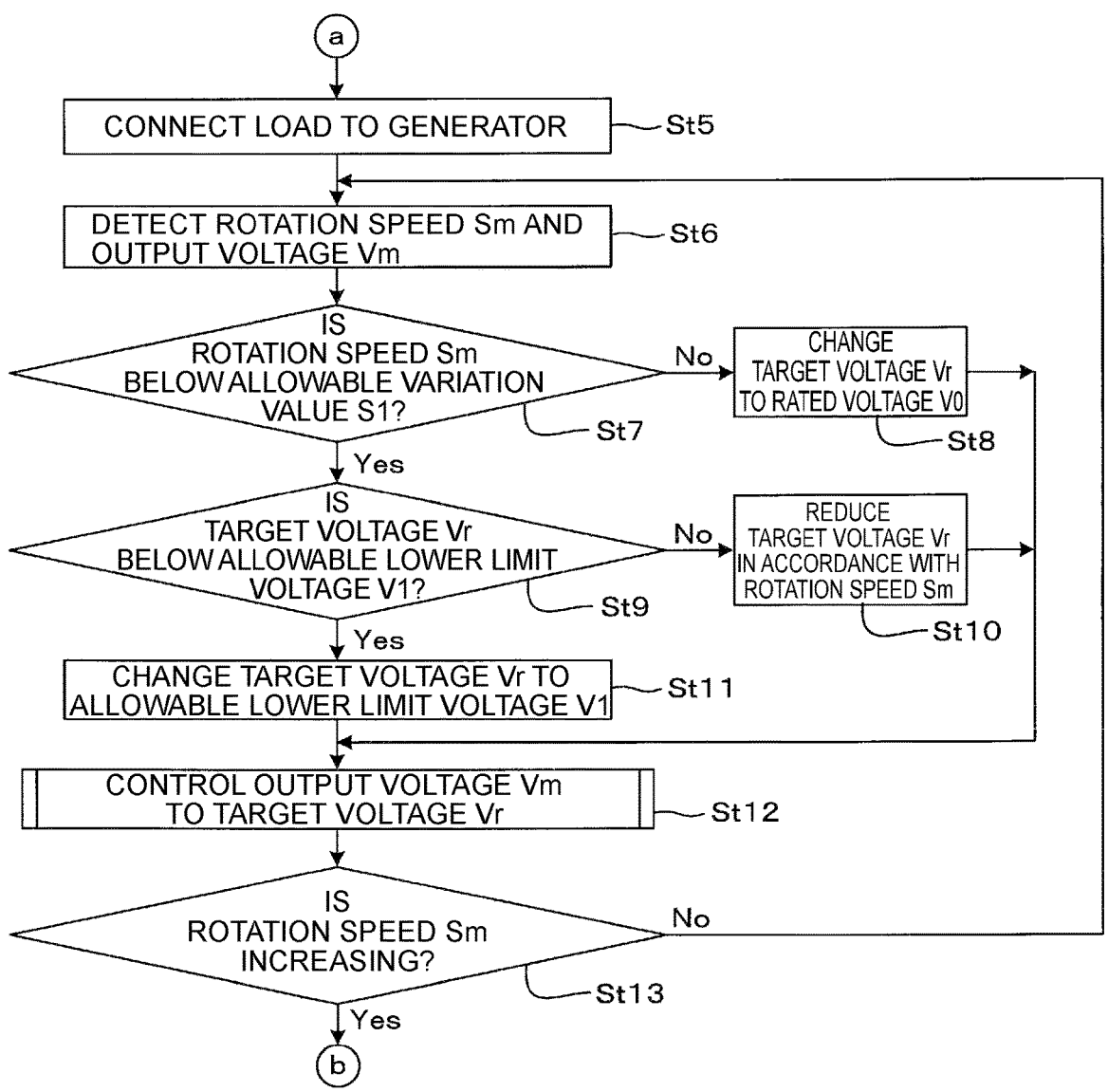
FIG. 6 is a flowchart showing the continued part of the control method of a power generation system according to an embodiment.
Figure 7:
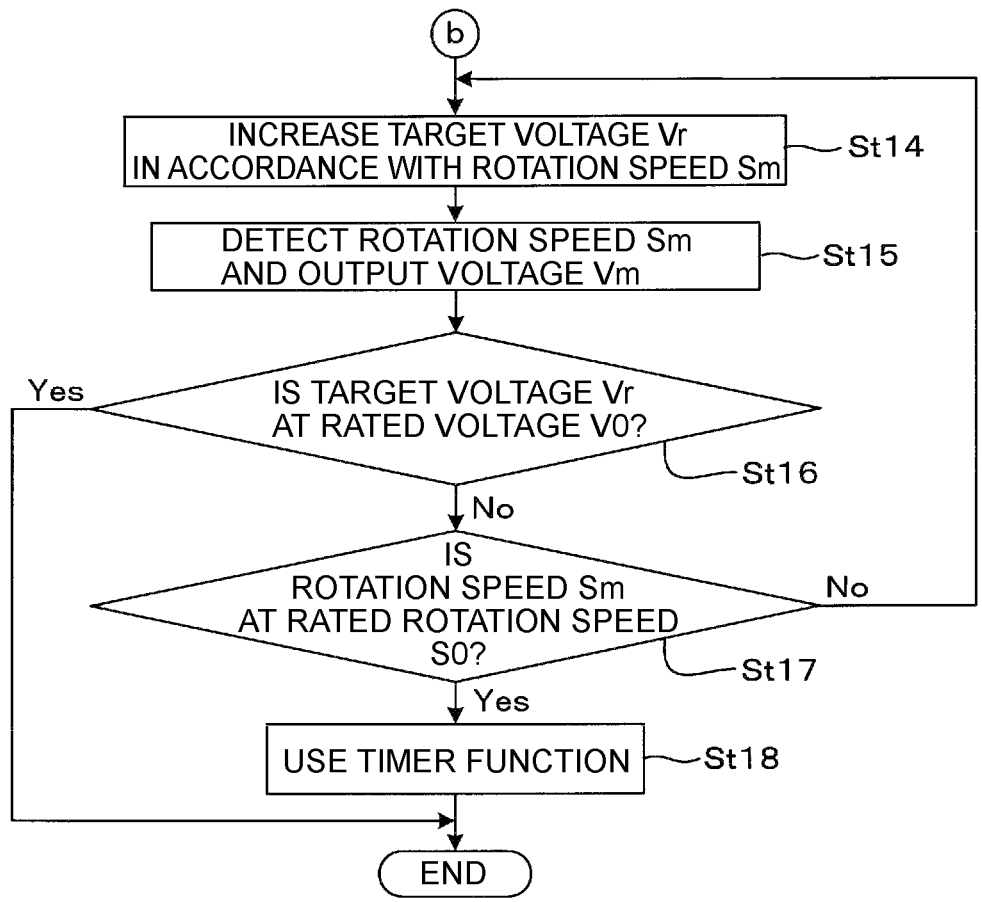
FIG. 7 is a flowchart showing the continued part of the control method of a power generation system according to an embodiment.

When the rotation speed Sm changes to an increasing trend (St13), the control device 4 increases the target voltage Vr of the generator 3 in accordance with the increase amount of the rotation speed Sm as a voltage increase operation (St14 of FIG. 7). At this time, specifically, as shown in FIG. 3 or 4, the target voltage regulator part 43 compares the rotation speed Sm at this time to the increase relation map M2, and calculates the target voltage Vr. The reference sign 'b' in FIG. 6 shows that the flowchart continues to the reference sign 'b' in FIG. 7.

When the rotation speed Sm increases again after decreasing below the allowable variation value S1, the target voltage Vr of the generator 3 is gradually increased on the basis of the increase relation map M2. In this way, it is possible to reduce the load of combustion for the gas engine 2.

Further, the rotation speed Sm and the output voltage Vm are detected (St15), and it is determined whether the target voltage Vr has reached the rated voltage V0 (St16). If the target voltage Vr has not become the rated voltage V0, it is determined whether the rotation speed Sm has become the rated rotation speed S0 (St17). If the rotation speed Sm has not become the rated rotation speed S0, the steps St14 to St17 are repeated until the target voltage Vr recovers to the rated voltage V0 on the basis of the increase relation map M2.

If the rotation speed Sm reaches the rated rotation speed S0 while the target voltage Vr has not reached the rated voltage V0, the target voltage regulator part 43 of the control device 4 utilizes the tinier function N instead of the increase relation map M2 (St17). Further, the target voltage regulator part 43 utilizes the timer function N to increase the target voltage Vr gradually with time until the target voltage Vr reaches the rated voltage V0. Then, if a stop signal of the power generation system 1 is inputted, the control device 4 performs a process to end the control.

Accordingly, after the target voltage Vr is reduced, when the output voltage V recovers to the rated voltage V0 in response to recovery of the rotation speed Sm, in other words, when the generation state of the generator 3 recovers to the rated state from an unstable transition state after connection of the load 7 to the generator 3, it is possible to supply electric power stably to the load 7 from the generator 3.

Figure 5:
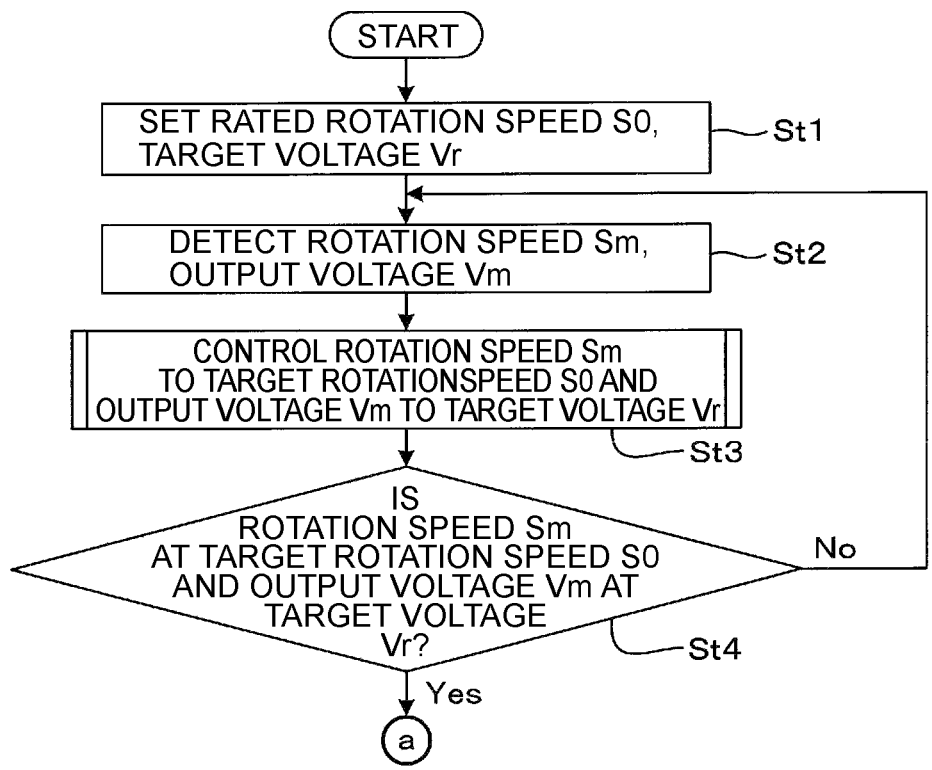
FIG. 5 is a flowchart showing the control method of a power generation system according to an embodiment.

The above described flowcharts of FIGS. 5 to 7 show an example of the control method of the power generation system 1. When the allowable variation value S1 is set as a value relatively apart from the rated rotation speed S0, and when the increase rate of the target voltage Vr in the increase relation map M2 is relatively high, for instance, the timer function N may be unnecessary.

Figure 8:
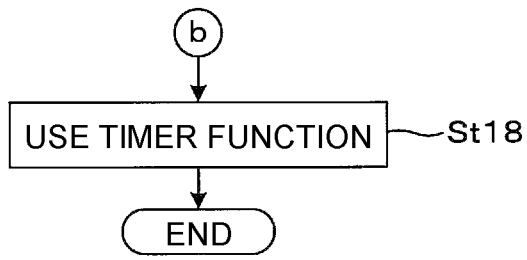
FIG. 8 is a flowchart showing another continued part of the control method of a power generation system according to an embodiment.

On the other hand, the flowchart in a case where only the timer function N is utilized as the voltage increase function (voltage increase operation) is shown by FIG. 8 instead of FIG. 7. The meaning of the timer function N is as described above.

As described above, according to the control device 4 and the control method of the power generation system 1 of the present embodiment it is possible to, by setting an appropriate target voltage for the generator 3, suppress reduction of the rotation speed Sm of the gas engine 2 to the bare minimum to protect the gas engine 2 from an excessive load and shorten the recovery time of the rotation speed Sm of the gas engine 2, while supplying electric power required for normal operation of loads from the generator 3.

Figure 9:
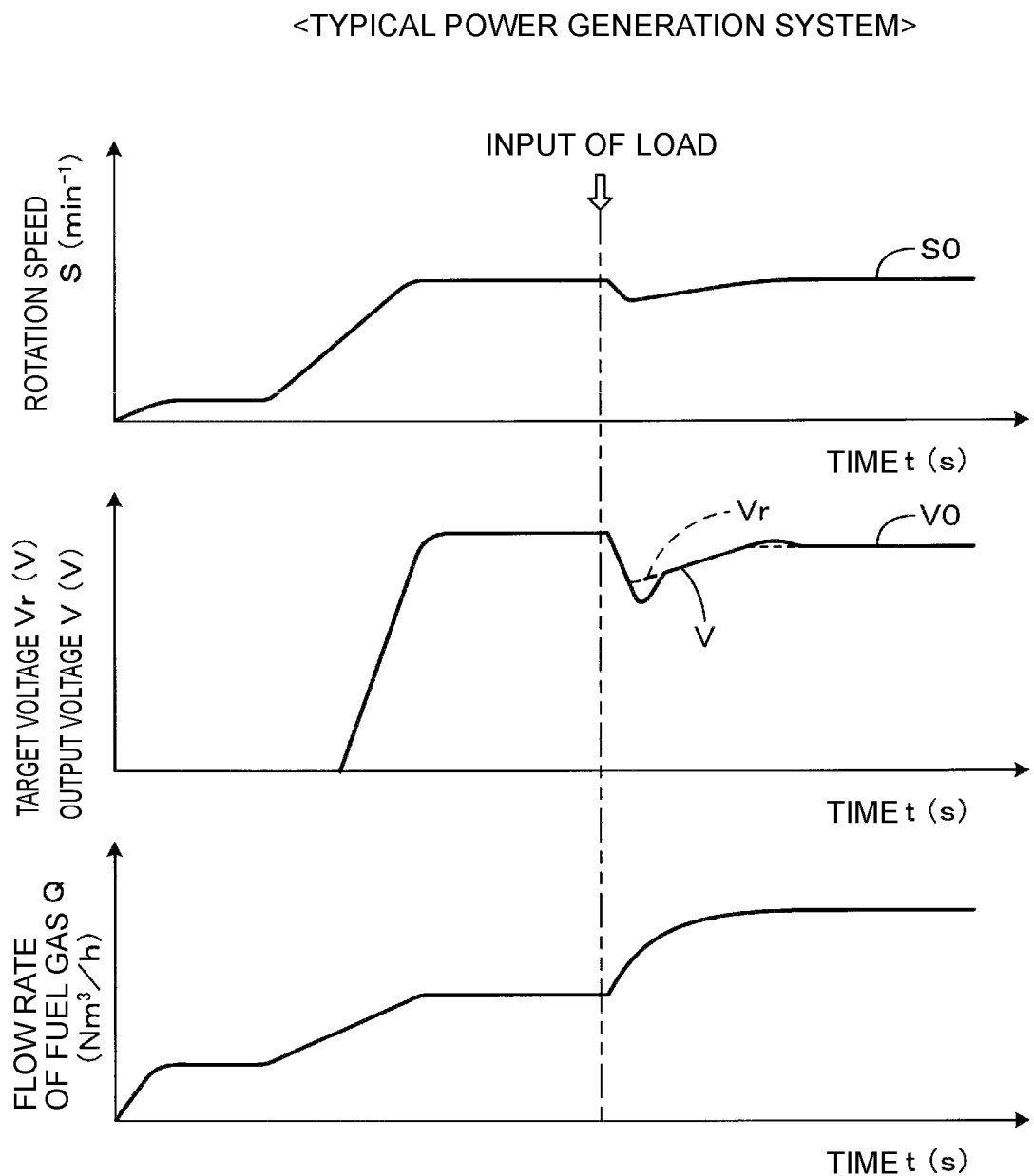
FIG. 9 is a graph showing the temporal change of rotation speed, target voltage, output voltage, flow rate of fuel gas of a typical power generation system according to an embodiment.

Next, the temporal change of the rotation speed S, the target voltage Vr, the output voltage V, and the flow rate Q of fuel gas at the time when the load 7 is inputted to the generator 3 will be described with reference to a graph. FIG. 9 shows a temporal change of a typical power generation system that does not have the function to limit the target voltage Vr of the generator 3 to the allowable lower limit voltage V1 with a target voltage regulator part. FIG. 10 is a graph that shows a temporal change of a power generation system of the present invention that has the function to limit the target voltage Vr of the generator 3 to the allowable lower limit voltage V1 with the target voltage regulator part 43.

As depicted in FIG. 9, in the typical power generation system, after the rotation speed S of the gas engine 2 and the output voltage V of the generator 3 settle at constant values through combustion of the gas engine 2, the load 7 is inputted to the generator 3 through operation of the circuit breaker 5 by the control device 4. At this time, the rotation speed S of the gas engine 2 and the output voltage V of the generator 3 decrease rapidly, and the flow rate Q of fuel gas increases in order to change the rotation speed S and the output voltage V to the rated rotation speed S0 and the target voltage Vr.

Further, the target voltage Vr is set to a low value in accordance with the decrease amount of the rotation speed S, through function of the target voltage regulator part. As the target voltage Vr is set to a low value as described above, the output voltage V of the generator decreases considerably, and the power generation system may fail to supply necessary voltage for operation of the load 7 upon connection of the load 7.

On the other hand, as depicted in FIG. 10, in the power generation system 1 of the present invention, after the rotation speed S of the gas engine 2 and the output voltage V of the generator 3 settle at constant values through combustion of the gas engine 2, the load 7 is inputted to the generator 3 through operation of the circuit breaker 5 by the control device 4. At this time, the rotation speed S of the gas engine 2 and the output voltage V of the generator 3 decrease rapidly, and the flow rate Q of fuel gas increases in order to change the rotation speed S and the output voltage V to the rated rotation speed S0 and the target voltage Vr.

Further, when the target voltage Vr is set to a low value in accordance with the decrease amount of the rotation speed S through function of the target voltage regulator part, it is possible to prevent the target voltage Vr from being set to be lower than the allowable lower limit voltage V1. Accordingly, it is possible to prevent the output voltage V of the generator from decreasing considerably, and it is possible to supply necessary voltage for operation of the load 7 upon connection of the load 7 using the power generation system 1.

The present invention is not limited to the above embodiments, and other different embodiments can be implemented within the range of the invention.

DESCRIPTION OF REFERENCE SIGNS

1 Power generation system
2 Gas engine
3 Generator
4 Control device
42 Automatic voltage regulator part
43 Target voltage regulator part
5 Circuit breaker
6 Grid power
7 load

The invention claimed is:
1. A control device for a power generation system including a generator which generates power through combustion of an engine and supplies electric power to a load via a circuit breaker, the control device comprising:
   an automatic voltage regulator part configured to control an output voltage of the generator to a target voltage of the generator; and
   a target voltage regulator part configured to adjust the target voltage of the generator,
   wherein the target voltage regulator part has:
      a voltage decrease function to reduce the target voltage of the generator in accordance with a decrease amount of a detection value of a rotation speed of the engine or a frequency of the generator if the detection value falls below an allowable variation value when the load is connected to the generator via the circuit breaker;
      a voltage decrease limiting function to maintain the target voltage of the generator at an allowable lower limit voltage determined on the basis of an output voltage which is allowable to carry out normal operation of the load, or at a value determined on the basis of the allowable lower limit voltage, if the target voltage of the generator which decreases in accordance with the decrease amount of the detection value is lower than the allowable lower limit voltage; and
      a voltage increase function to increase the target voltage of the generator to a rated voltage at the time of steady operation if the detection value increases again after the detection value falls below the allowable variation value.

2. The control device for the power generation system according to claim 1,
   wherein the voltage increase function is configured to increase the target voltage of the generator in accordance with an increase amount of the detection value, and
   wherein an increase gradient of the target voltage of the generator with respect to the increase amount of the detection value in the voltage increase function is less sharp than a decrease gradient of the target voltage of the generator with respect to the decrease amount of the detection value in the voltage decrease function.

3. The control device for the power generation system according to claim 2,
   wherein the voltage increase function is configured to increase the target voltage of the generator gradually with time if the detection value exceeds a rated value at the time of the steady operation or if the detection value is expected to exceed the rated value, when increasing the target voltage of the generator in accordance with the increase amount of the detection value.

4. The control device for the power generation system according to claim 1,
   wherein the voltage increase function is configured to increase the target voltage of the generator gradually with time.

5. A method of controlling a power generation system including a generator which generates power through combustion of an engine and supplies electric power to a load via a circuit breaker, the method comprising:

controlling an output voltage of the generator to a target voltage of the generator, wherein the controlling of the output voltage includes:
- a voltage decrease operation to reduce the target voltage of the generator in accordance with a decrease amount of a detection value of a rotation speed of the engine or a frequency of the generator if the detection value falls below an allowable variation value when the load is connected to the generator via the circuit breaker;
- a voltage decrease limiting operation to maintain the target voltage of the generator at an allowable lower limit voltage determined on the basis of an output voltage which is allowable to carry out normal operation of the load, or at a value determined on the basis of the allowable lower limit voltage, if the target voltage of the generator which decreases in accordance with the decrease amount of the detection value is lower than the allowable lower limit voltage; and
- a voltage increase operation to increase the target voltage of the generator to a rated voltage at the time of steady operation if the detection value increases again after the detection value falls below the allowable variation value.

6. The method of controlling the power generation system according to claim 5,
wherein the voltage increase operation includes increasing the target voltage of the generator in accordance with an increase amount of the detection value, and
wherein an increase gradient of the target voltage of the generator with respect to the increase amount of the detection value in the voltage increase operation is less sharp than a decrease gradient of the target voltage of the generator with respect to the decrease amount of the detection value in the voltage decrease operation.

7. The method of controlling the power generation system according to claim 6,
wherein the voltage increase operation includes increasing the target voltage of the generator gradually with time if the detection value exceeds a rated value at the time of the steady operation or if the detection value is expected to exceed the rated value, when increasing the target voltage of the generator in accordance with the increase amount of the detection value.

8. The method for controlling the power generation system according to claim 5,
wherein the voltage increase operation includes increasing the target voltage of the generator gradually with time.

* * * * *